US010135621B2

(12) United States Patent
Rombouts et al.

(10) Patent No.: US 10,135,621 B2
(45) Date of Patent: Nov. 20, 2018

(54) METHOD TO REDUCE THE LATENCY OF ECDSA SIGNATURE GENERATION USING PRECOMPUTATION

(71) Applicant: NXP B.V., Eindhoven (NL)

(72) Inventors: Peter Maria Franciscus Rombouts, Sint-Katelijne-Waver (BE); Timotheus Arthur van Roermund, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/145,671

(22) Filed: Dec. 31, 2013

(65) Prior Publication Data

US 2015/0188713 A1    Jul. 2, 2015

(51) Int. Cl.
*H04L 29/06* (2006.01)
*H04L 9/32* (2006.01)
*H04L 9/30* (2006.01)

(52) U.S. Cl.
CPC .......... *H04L 9/3252* (2013.01); *H04L 9/3066* (2013.01); *H04L 2209/046* (2013.01); *H04L 2209/122* (2013.01); *H04L 2209/72* (2013.01); *H04L 2209/76* (2013.01)

(58) Field of Classification Search
CPC ... H04L 9/3281; H04L 9/3252; H04L 9/3236; H04L 9/6312; H04L 9/00; G06F 1/30097
See application file for complete search history.

(56) References Cited

U.S. PATENT DOCUMENTS

| 7,127,067 | B1 * | 10/2006 | Wachtler | H04L 9/0833 |
| | | | | 380/255 |
| 8,307,211 | B2 * | 11/2012 | Vanstone | 713/175 |
| 2006/0242417 | A1 | 10/2006 | Paya et al. | |
| 2007/0276762 | A1 | 11/2007 | Athens et al. | |
| 2011/0194694 | A1 * | 8/2011 | Struik | 380/255 |

FOREIGN PATENT DOCUMENTS

| CN | 101213814 A | 7/2008 |
| CN | 101330385 A | 12/2008 |
| EP | 2378707 A1 | 10/2011 |
| EP | 2 498 438 A1 | 9/2012 |

(Continued)

OTHER PUBLICATIONS

"Status of ITS Security Standards—Document HTG1-1—EU-US ITS Task Force Standards Harmonization Working Group Harmonization Task Group 1", U.S. Department of Transportation, 78 pgs, retrieved from the internet at: ec.europa.eu/information_society/newsroom/cf/dae/document.cfm? (Nov. 12, 2012).

(Continued)

*Primary Examiner* — Joseph P Hirl
*Assistant Examiner* — Leynna Truvan

(57) ABSTRACT

In order to reduce latency of elliptical curve digital signature generation a portion of the digital signature is pre-calculated before receipt of the message hash using an unmodified ECDSA computing engine. After the message hash is received, the digital signature is completed without using the ECDSA computing engine. Applications include generating digital signatures for the safety messages in Intelligent Transport Systems.

12 Claims, 11 Drawing Sheets

(56) References Cited

FOREIGN PATENT DOCUMENTS

WO      9925092 A2    5/1999

OTHER PUBLICATIONS

"ETSI TS 102 687—V1.1.1 Intelligent Transport Systems (ITS); Decentralized Congestion Control Mechanisms for Intelligent Transport Systems Operating in the 5 GHz Range; Access Layer Part", ETSI, 45 pgs, retrieved from the internet at: www.etsi.org/.../etsi_ts/102600_102699/102687/.../ts_102687v010101p (Jul. 2007).

Anonymous: "OpenXDAS:win32/external/openssl/include/openssl/ecdsa.h File Reference", k Aug. 2009 (Aug. 20, 2009), XP055190555,Retrieved from the Internet:URL:http://openxdas.sourceforge.net/doxygen/html/ecdsa_8h.html[retrieved on May 20, 2015] ECDSA_sign_setup, p. 2 and 8.

Etsi: "Intelligent Transport Systems(ITS); Security; Security header and certificate formats Technical Specification", Apr. 1, 2013 (Apr. 1, 2013), pp. 2013-2014, XP055190564,Retrieved from the Internet: URL:http://www.etsi.org/deliver/etsi TS/103000 103099/103097/01.01.01 60/ts 103097v010101p.pdf[retrieved on May 20, 2015] section 4.2.10.

European Search Report, 14199402, dated May 22, 2015.

Office Action for CN Counterpart patent appln. No. 201410836585.0 (dated Aug. 1, 2017).

\* cited by examiner

METHOD TO REDUCE THE LATENCY OF ECDSA SIGNATURE GENERATION USING PRECOMPUTATION

BACKGROUND

Intelligent Transportation Systems (ITS) relate to systems in which information and communication technologies are applied in the field of road transport, including infrastructure, vehicles and users, and in traffic management and mobility management. One feature of ITS is the Vehicle-Originating Broadcast (VOB). The originating vehicle broadcasts information about its movements and safety-related attributes frequently to make sure that this information is available to other vehicles so that each receiving vehicle can identify potentially hazardous situations arising from the behavior of the transmitting vehicle.

This typically involves transmission of Basic Safety Messages which need to include the following security requirements: authenticity, integrity, authorization and privilege classes, non-repudiation of origin and anti-replay related to having a message signature. ITS security standards as disclosed in ETSI TS 102 687 v 1.1.1 incorporated herein by reference, along with "Status of ITS Security Standards", Document HTG1-1, US Department of Transportation/European Commission, Version 2012-11-12, in their entirety specify the minimum interval between Basic Safety Messages as 40 ms. Any VOB system that satisfies the standard needs to be able to send a Basic Safety Message every 40 ms. However, as noted above, each Basic Safety Message requires a message signature to satisfy security requirements which means the Basic Safety Message needs to be signed. Given that the minimum message interval is 40 ms, the total time budget available to generate a complete digital signature is 40 ms. However, from an application point of view, it is typically not acceptable to impose a latency of up to 40 ms for generation of a digital signature, especially for Basic Safety Messages. This typically requires that the signature generation latency be below about 10 ms. Note that signature generation (signing the message) needs to be performed in a secure environment such as that offered by a secure element or more precisely by the secure element's software crypto library and the cryptographic coprocessor whereas signature verification does not need to be performed in the secure environment. The secure environment represented by, for example, the crypto library of the cryptographic coprocessor, typically possesses less powerful hardware than the less secure environment hardware.

BRIEF DESCRIPTION OF THE DRAWINGS

FIG. 1b shows the time budget for calculating the signature in FIG. 1a.

FIG. 2b shows the time budget for the computations in FIG. 2a.

DETAILED DESCRIPTION

The signature scheme selected for Basic Safety Messages in ITS is the Elliptic Curve Digital Signature Algorithm (ECDSA). ECDSA requires designation of the elliptic curve E defined over a finite field $F_q$ and elliptic curve base point $G \in E(F_q)$ to be used as a generator of the elliptic curve subgroup with a large prime order n, where n, an integer, is the order of G which means that n*G=O (where O is the identity element and * denotes elliptic curve point multiplication by a scalar).

Figure 1A:
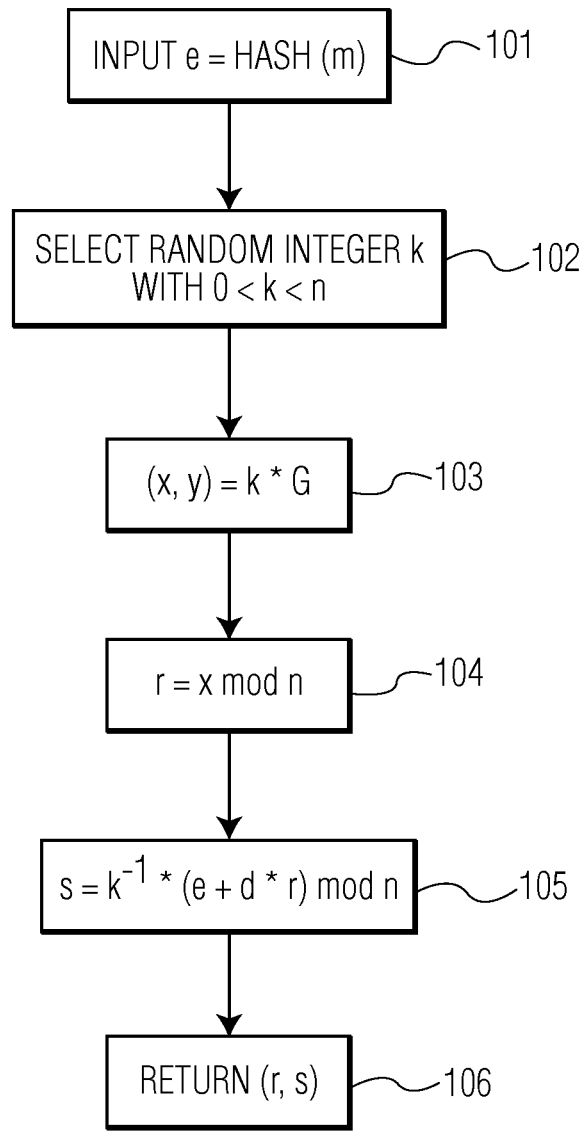
FIG. 1a shows steps for calculating an ECDSA signature in the prior art.

FIG. 1a shows the typical steps of the ECDSA signature generation function for generating the pair (r, s) which is the digital message signature. In step 101, e, the HASH (cryptographic hash function) of the message m (e.g. safety message) is input. The cryptographic hash function, HASH, may be the Secure Hash Algorithm-2 (SHA-2) provided by the NSA or other suitable cryptographic hash functions. In step 102, a random integer k between 0 and n is selected. In step 103, the curve point (x, y)=k*G is computed. In step 104, r=x mod n is computed where mod is short for the modulus operation. In step 105, $s=k^{-1}*(e+d*r)$ mod n is computed where d is the private key integer. Finally, in step 106, the digital message signature (r, s) is returned.

Figure 1B:
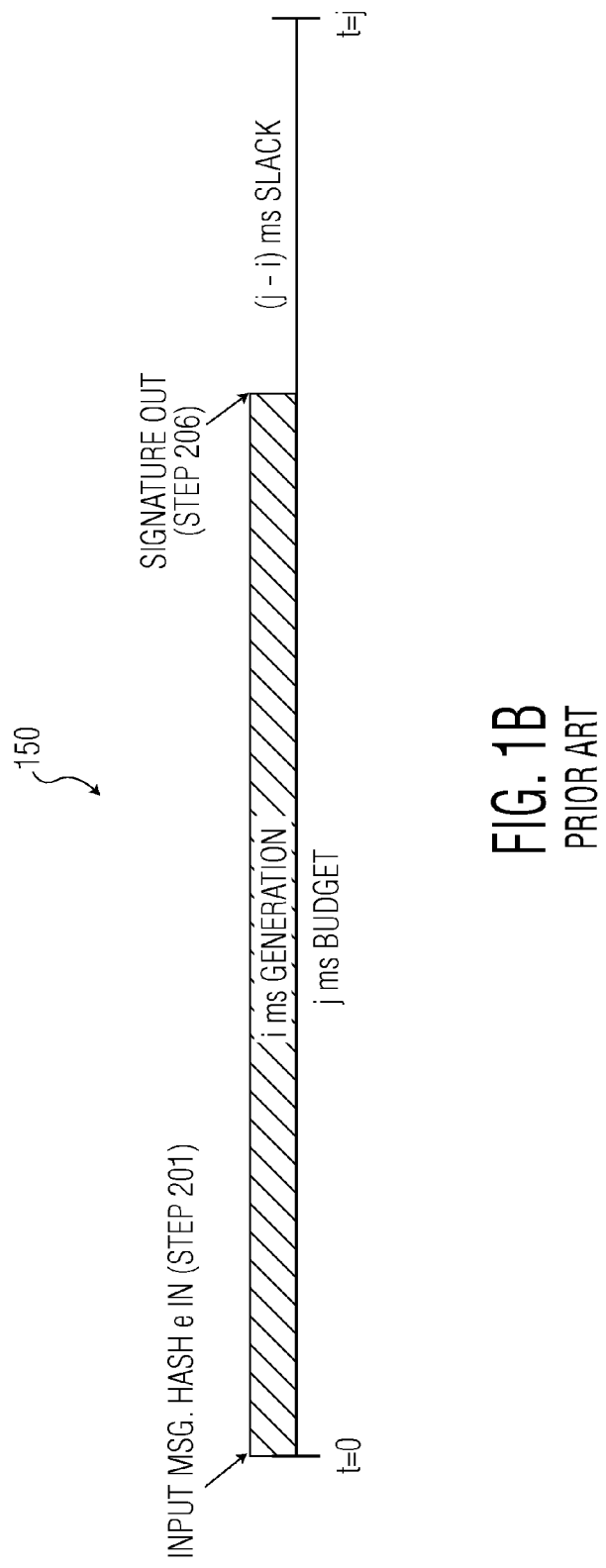

FIG. 1b shows time budget 150 for the ECDSA signature generation function. At t=0, after the message m has been received, the message hash e is input into the ECDSA signature generation function which requires i milliseconds to compute the message signature leaving (j−i) milliseconds "slack" time. Here, j is minimum interval between Basic Safety Messages, for example, or data packets in other applications requiring ECDSA signature generation.

Figure 2A:
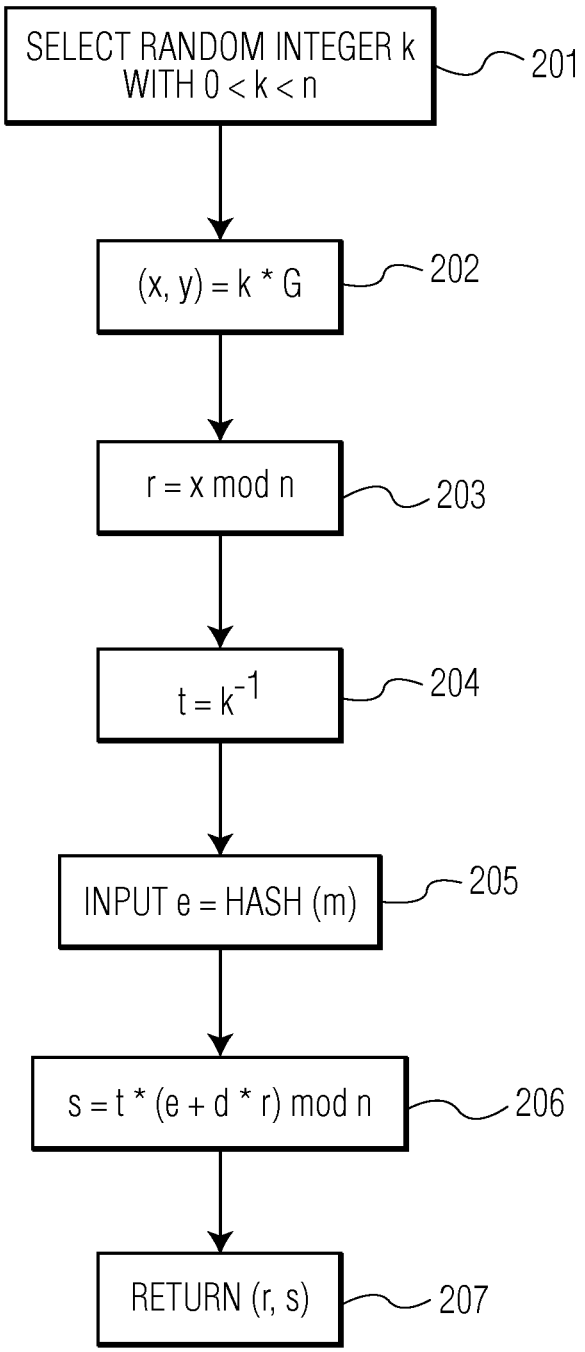
FIG. 2a shows pre-computing a portion of the ECDSA signature before inputting the message hash in the prior art.

A typical approach to reducing latency of the ECDSA signature generation function is to pre-compute quantities in the ECDSA signature generation function that do not depend on the cryptographic hash function of the message, HASH (m) such as r and $k^{-1}$. FIG. 2a shows an implementation of the ECDSA signature generation function that uses the time before message is available to pre-compute r and $k^{-1}$ before the message hash e is available and input. In step 201, a random integer k between 0 and n is selected. In step 202, the curve point (x, y)=k*G is computed. In step 203, r=x mod n is computed where mod is short for the modulus operation. In step 204, $t=k^{-1}$ is computed. At the time of step 205, the message m is received and HASH (m) is computed and input as e. In step 206, s=t*(e+d*r) mod n is computed where d is the private key integer. Finally, in step 207, the digital message signature (r, s) is returned.

Figure 2B:
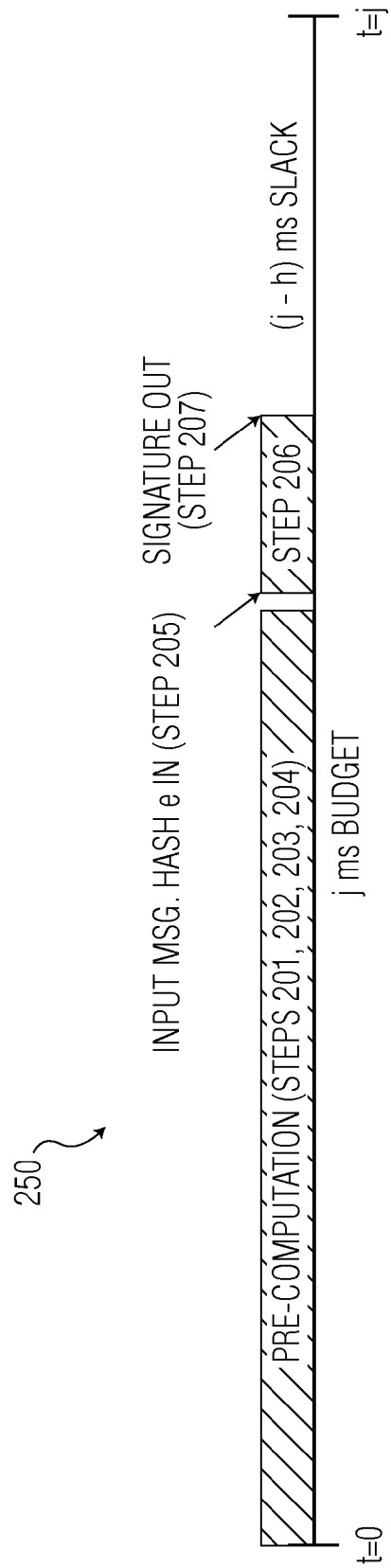

FIG. 2b shows time budget 250 for the ECDSA signature generation function. At t=0, signature generation function initiates pre-computation of steps 201, 202, 203 and 204 which requires α milliseconds to compute. e=HASH(m) is input in step 205 when e becomes available. Note this may be some time after the pre-computations have been completed. Step 206 completing the ECDSA digital signature is then performed and the completed digital message signature is output in step 207 after h milliseconds leaving (j−h) milliseconds "slack" time. Here, j is minimum interval between Basic Safety Messages, for example, or data packets in other applications requiring low latency m A typical problem with the approach shown in FIGS. 2a and 2b is that the splitting the ECDSA signature computation into two operations typically requires modifications to an ECDSA computing engine where the ECDSA signature is typically generated. The ECDSA computing engine typically includes functions for modular addition, modular multiplication, modular inversion and other functions used in elliptical curve cryptography. The interface between the ECDSA computing engine and the portion of the secure microcontroller running user software typically is restricted in what underlying functions of the ECDSA computing engine are accessible via the user software running on the secure microcontroller. Embodiments of the ECDSA computing engine typically include a cryptographic coprocessor that is optionally controlled by a crypto library running on a microprocessor that is electrically connected to the cryptographic coprocessor. Optionally, embodiments of an ECDSA computing engine may also have a firmware running on the cryptographic coprocessor to control the coprocessor. However, any modifications to an ECDSA computing engine that has undergone a security evaluation may require recertification of the entire ECDSA computing engine which is typically time consuming and costly and even hardware redesign may be necessary to implement the needed modifications. In accordance with the invention, the advantage of employing pre-computation to lower ECDSA signature generation latency is achieved without the need for any modifications to the existing ECDSA computing engine for generating an ECDSA signature.

Figure 3A:
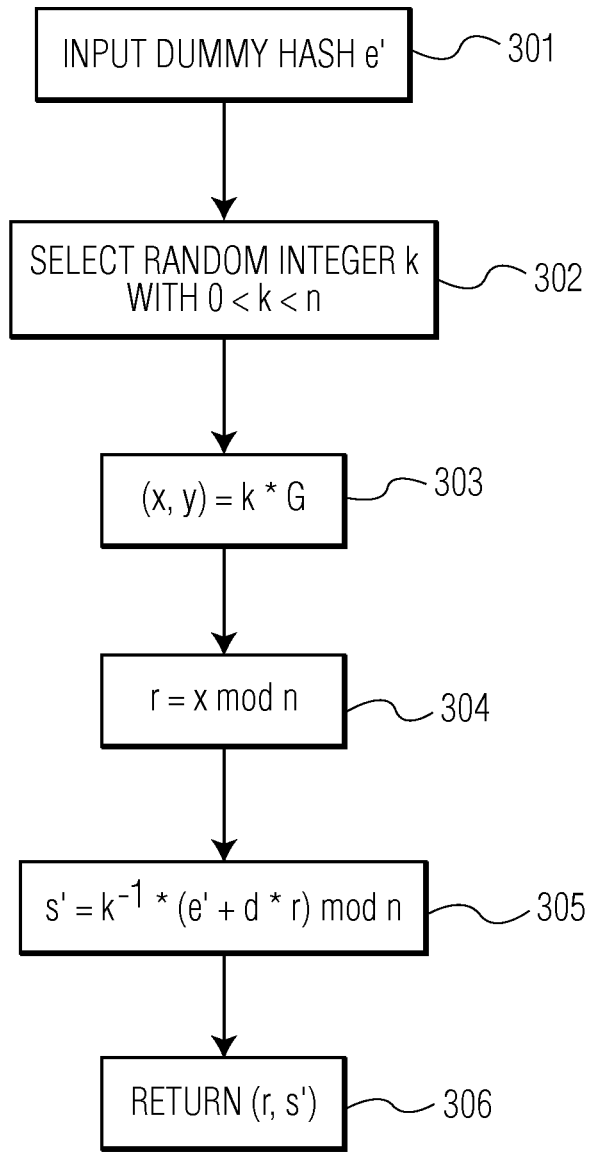
FIGS. 3a-b shows an embodiment in accordance with the invention.

In an embodiment in accordance with the invention, the pre-computation involves generating a complete ECDSA signature s 'but using a dummy hash e' as input to the computation, as shown in FIG. 3a. The computation of s' is performed in the unmodified ECDSA computing engine. In step 301, dummy hash e' is input into the ECDSA signature generator which is part of the ECDSA computing engine. In step 302, a random integer k between 0 and n is selected. In step 303, the curve point (x, y)=k*G is computed. In step 304, r=x mod n is computed where mod is short for the modulus operation. In step 305 s'=$k^{-1}$*(e'+d*r) mod n is computed. s' is incomplete as its computation lacks the actual message hash but instead uses the dummy input e'. Finally, in step 306, the digital message signature (r, s') for dummy hash e' is returned. Digital message signature (r, s') is an incomplete digital signature.

The actual s=s'+$k^{-1}$ (e-e') mod n for the message m still needs to be computed. This requires determination of $k^{-1}$ which can be derived from s'=$k^{-1}$*α mod n=$k^{-*}$(e'+d*r) mod n if $α^{-1}$=$(e'+d*r)^{-1}$ mod n is known. Then $k^{-1}$=s'*$α^{-1}$ mod n can be computed.

Figure 3B:
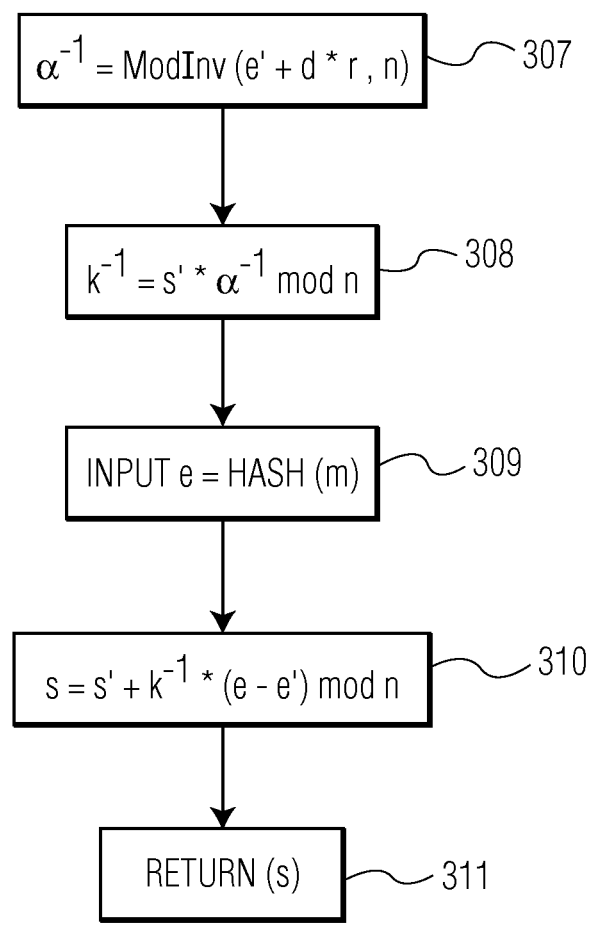

An embodiment in accordance with the invention is shown in FIG. 3b to complete the digital signature. In step 307, the modular inversion of α=(e'+d*r) over $Z_n$, $α^{-1}$=ModInv (α, n) is computed. The modular inverse may be computed in the cryptographic coprocessor if the interface between the secure microprocessor and the cryptographic coprocessor allows direct access by user software running on the secure microprocessor to the ModInv function on the cryptographic coprocessor. In step 308, $k^{-1}$=s'*$α^{-1}$ mod n is computed. In step 309, e, the actual HASH (cryptographic hash function) of the message m to be signed, HASH (m)=e is input. In step 310, s of the digital signature (r, s) of the message m is computed as s=s'+$k^{-1}$*(e-e') mod n. In step 311, the value s of the digital signature (r, s) is returned. Note that steps 307-310 are not performed in the already security-hardened ECDSA computing engine but outside of it. Hence, some blinding or obfuscation may be desirable to also secure the operations in steps 308 and 310 against information leakage. Also the values s' and e' should be secret, because if s' and e' are known along with e and s (which are public) then $k^{-1}$ (and therefore k) can be computed from s. This allows the computation of d, the private key integer, from s' using r which is public. Therefore, blinding of the operations on the secret values $α^{-1}$ and s' in step 308 and, $k^{-1}$ and s' in step 310 may be desirable.

Figure 3C:
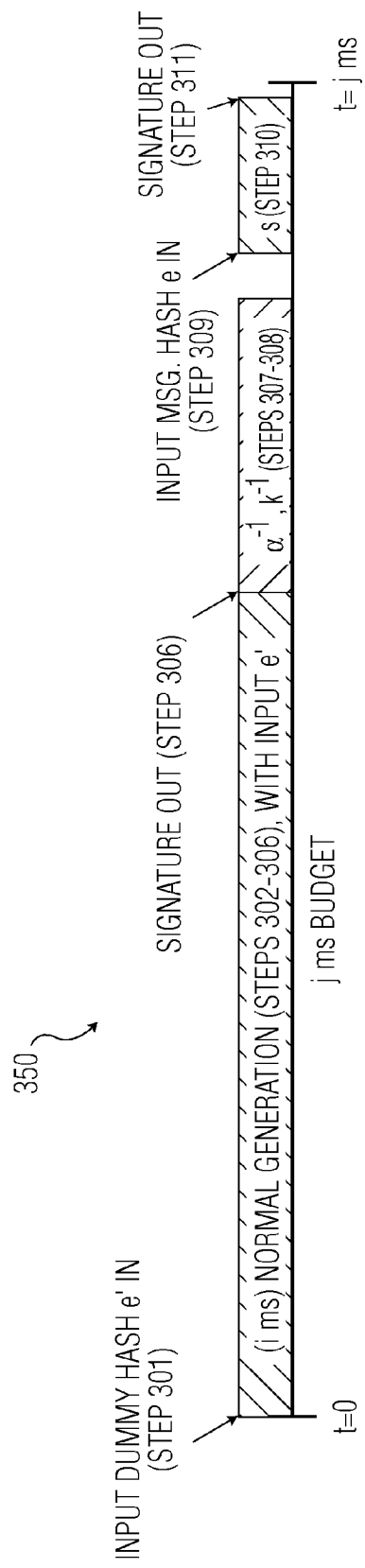
FIG. 3c shows the time budget for the computation in FIGS. 3a-b.

FIG. 3c shows time budget 350 for the ECDSA signature generation function for an embodiment in accordance with the invention. At t=0, the message dummy hash e' is input into the ECDSA signature generation function which requires i milliseconds to compute the message signature s' for dummy hash e', leaving (j−i) milliseconds time leftover for the pre-computation of $α^{-1}$ and $k^{-1}$ insteps 307-308, input of e=HASH(m) in step 309, computation of s in step 310 and the output of s in step 311. Here, j is minimum interval between Basic Safety Messages, for example, or data packets in other applications requiring low latency ECDSA signature generation.

The embodiment in accordance with the invention shown in FIGS. 3a-c precludes a further optimization of the computation which involves the pre-computation of $d^{-1}$ where d is the private key integer. Typically, the private key integer d is not changed after each ECDSA signature generation. In the ITS system, for example, a new private key is only loaded when the pseudo-identity is switched and this is done on the order of every 5 minutes or more and only in non-safety critical situations, when the latency requirements are less strict, and therefore the computation of $d^{-1}$ can be ignored from a latency point of view.

Figure 4A:
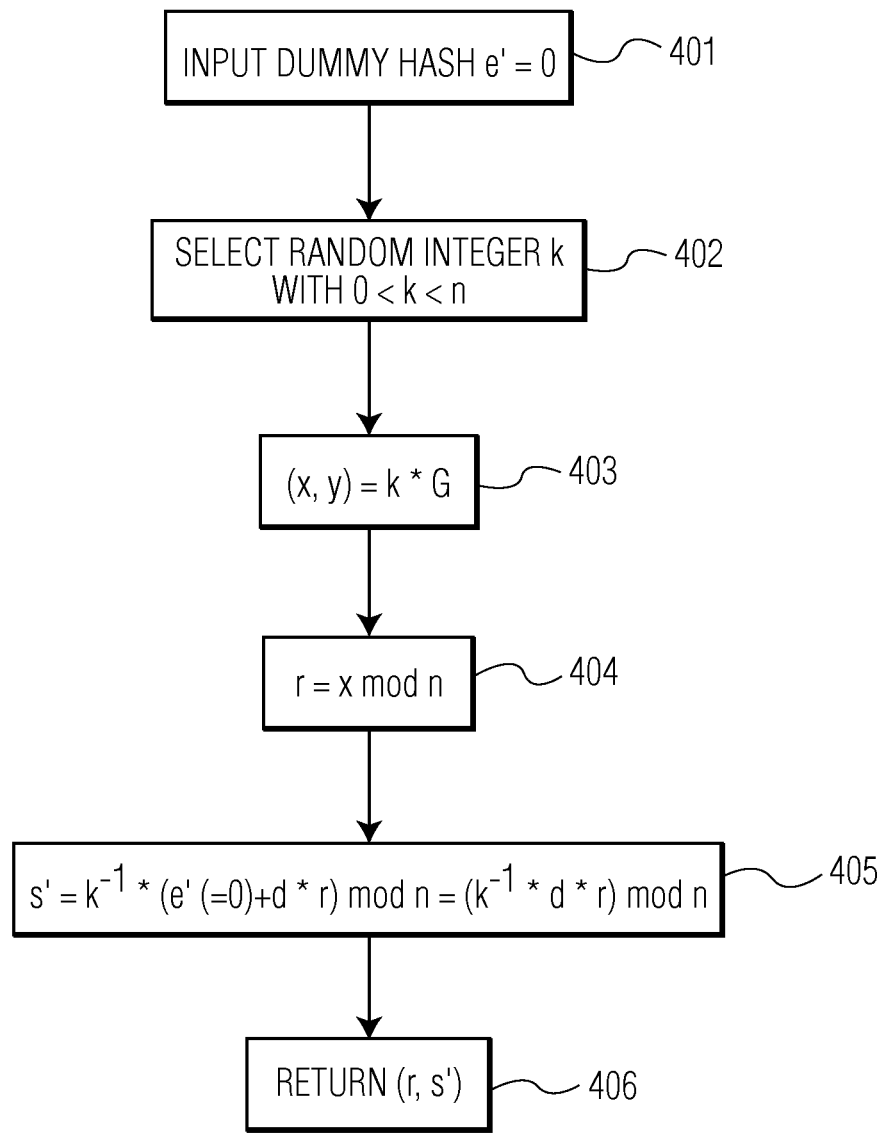
FIGS. 4a-b shows an embodiment in accordance with the invention.

In an embodiment in accordance with the invention, the pre-computation involves generating a complete ECDSA signature but for e=0 as shown in FIG. 4a which is performed using the unmodified ECDSA computing engine. Setting e=0 allows for the pre-computation of $d^{-1}$ for further optimization but does not blind the inversion operation in step 407 below which uses d whereas in step 308 above, d is blinded because it is part of α. In step 401, e=0 is input into the ECDSA signature generator. In step 402, a random integer k between 0 and n is selected. In step 403, the curve point (x, y)=k*G is computed. In step 404, r=x mod n is computed where mod is short for the modulus operation. In step 405, s'=$k^{-1}$*(0+d*r) mod n=($k^{-1}$*d*r) mod n is computed where d is the private key integer. s' is incomplete as its computation lacks the actual message hash but uses the dummy input e=0. Finally, in step 406, the digital message signature (r, s) for e=0 is returned. Digital message signature (r, s') is an incomplete digital signature.

The actual s=s'+($k^{-1}$*e) mod n for the message m still needs to be computed. This requires determination of $k^{-1}$ which can be derived from s'=($k^{-1}$*d*r) mod n if both $d^{-1}$ and $r^{-1}$ are known. Then $k^{-1}$=(s'*$d^{-1}$*$r^{-1}$) mod n. $r^{-1}$ needs to be computed for every digital message signature as a new selection of k is required for each digital message signature. The value $d^{-1}$ can be pre-computed for multiple signatures: for each private key integer d, $d^{-1}$=ModInv (d, n) needs to be computed only once, where ModInv is the modular inversion operation in $Z_n$ (=integers 0, 1, . . . , n−1). The modular inverse may be computed in the cryptographic coprocessor if the interface between the secure microprocessor and the cryptographic coprocessor allows direct access by user software running on the secure microprocessor to the ModInv function on the cryptographic coprocessor. As long as the same private key integer d is used for the digital signature, the result of $d^{-1}$ can therefore effectively be regarded as a constant for the purposes of this discussion.

Figure 4B:
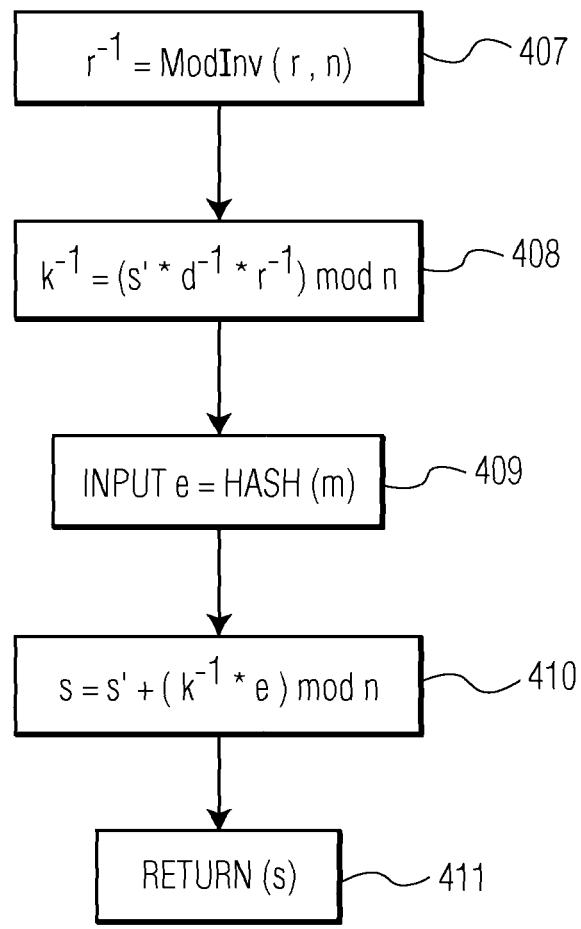

In an embodiment in accordance with the invention shown in FIG. 4b, in step 407, the modular inversion of r over $Z_n$, $r^{-1}$=ModInv (r, n) is computed. The modular inverse may be computed in the cryptographic coprocessor if the interface between the secure microprocessor and the cryptographic coprocessor allows direct access by user software running on the secure microprocessor to the Mod-Inv function on the cryptographic coprocessor. In step 408, $k^{-1}=(s'*d^{-1}*r^{-1})$ mod n is computed. In step 409, e=HASH (m), the HASH (cryptographic hash function) of the message m to be signed is input. In step 410, s of the digital signature (r, s) (note r was previously computed) is computed as $s=s'+(k^{-1}*e)$ mod n. Note that steps 407-411 are not performed in the security-hardened ECDSA computing engine but typically using the cryptographic coprocessor configured for such operations. Hence, some blinding or obfuscation may be desirable to also secure the operations in steps 408 and 410 against information leakage with respect to the two secret values: d, the private key integer, and k, the random integer picked in step 402. Also the value s' should be secret, because if s' is known along with e and s (which are public) then $k^{-1}$ (and therefore k) can be computed from s. This allows the computation of d, the private key integer, from s' using r which is public. Therefore, blinding of the operations on the secret values $d^{-1}$, $k^{-1}$ and s' in steps 408 and 410 may be desirable. Additionally, the modular inversion operation on the private key integer d in a pre-computation is a good candidate for blinding because this modular inversion operation is also performed outside the security-hardened ECDSA computing engine.

Figure 4C:
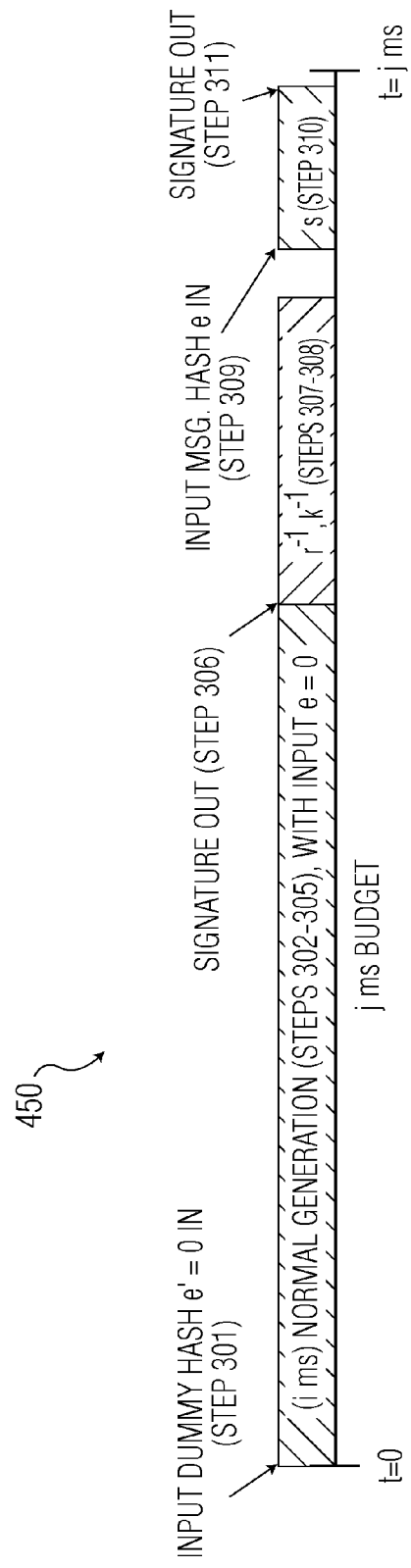
FIG. 4c shows the time budget for the computation in FIGS. 4a-b.

FIG. 4c shows time budget 450 for the ECDSA signature generation function for an embodiment in accordance with the invention. At t=0, the message hash e=0 is input into the ECDSA signature generation function which requires i milliseconds to compute the message signature s' for e=0, leaving (j−i) milliseconds time leftover for the pre-computation of $r^{-1}$ and $k^{-1}$ steps 407-408, input of e=HASH(m) in step 409, computation of s in step 410 and the output of s in step 411. Here, j is minimum interval between Basic Safety Messages, for example, or data packets in other applications requiring low latency ECDSA signature generation.

Figure 5:
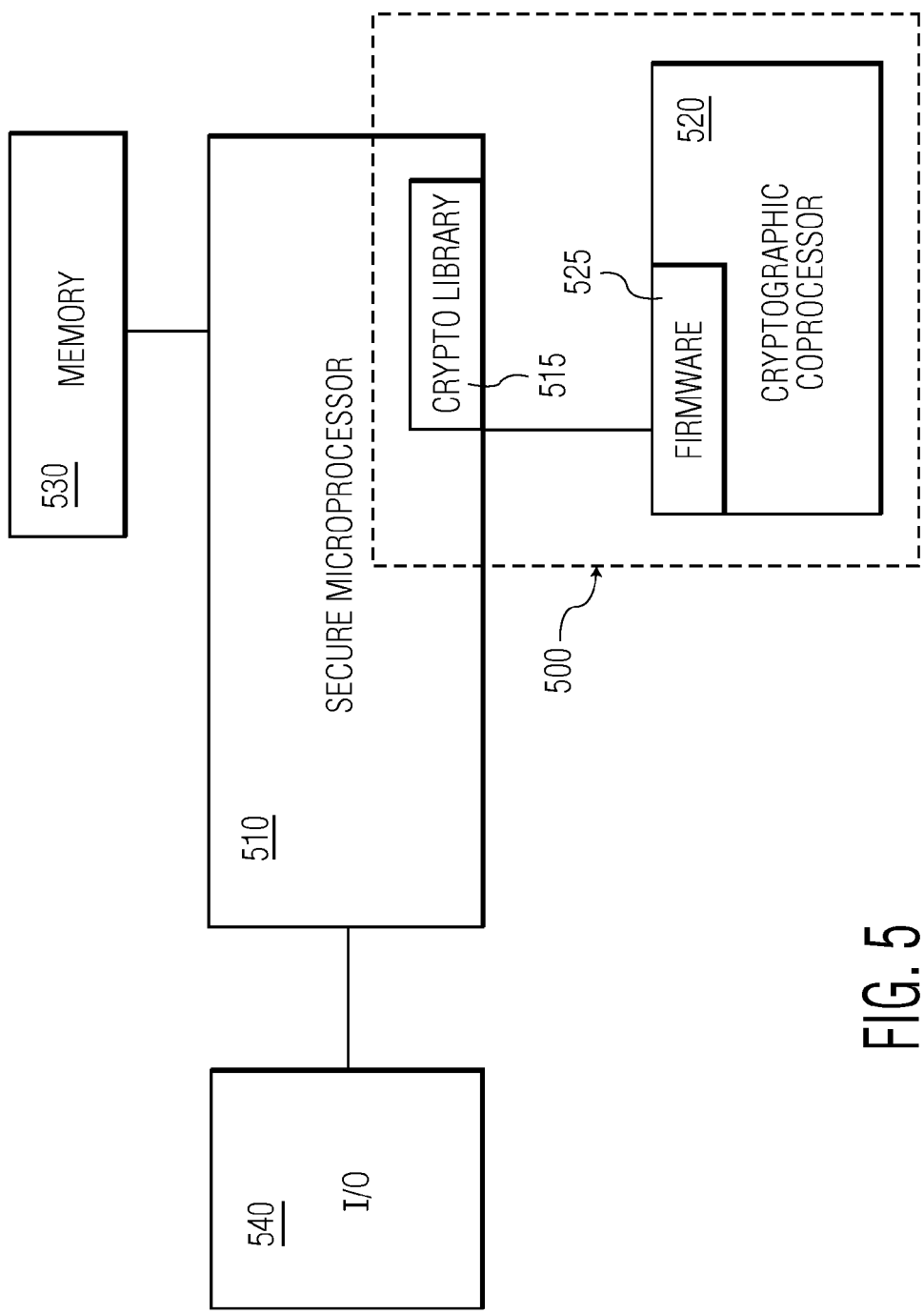
FIG. 5 shows an embodiment in accordance with the invention.

FIG. 5 shows an embodiment in accordance with the invention including ECDSA computing engine 500. ECDSA computing engine 500 includes cryptographic coprocessor 520 that is optionally controlled by crypto library 515 running on secure microprocessor 510 that is interfaced to cryptographic coprocessor 520. ECDSA computing engine 500 may also include firmware 525 running on cryptographic coprocessor 520 to control coprocessor 520.

Secure microprocessor 510 is electrically coupled to cryptographic coprocessor 520 and together execute a software crypto library 515 for generating an elliptical curve digital signature. Optionally, firmware 525 may be present on cryptographic coprocessor 520 and used to control coprocessor 520. Secure microprocessor is electrically coupled to memory 530 which may include a secure memory. Finally, secure microprocessor 510 is electrically coupled to input/out (I/O) 540 which is configured to output the elliptical curve digital signature as part of a transmitted message or data packet. For example, in an ITS type system, the embodiment in FIG. 5 would be in a transmitting vehicle which broadcasts information about its movements and safety-related attributes in frequent digitally signed safety messages to make sure that this information is available to other vehicles so that each receiving vehicle can identify potentially hazardous situations rising from the behavior of the transmitting vehicle.

The invention claimed is:

1. A method to reduce the latency of elliptical curve digital signature generation using pre-computation comprising:
   pre-computing an incomplete elliptical curve digital signature using a security-hardened ECDSA computing engine, wherein the incomplete elliptical curve digital signature is pre-computed using a dummy message hash;
   receiving, in a cryptographic coprocessor, a message hash outside of the security-hardened ECDSA computing engine; and
   completing, in the cryptographic coprocessor, computation of an elliptical curve digital signature outside of the security-hardened ECDSA computing engine after the receipt of the message hash by using the incomplete elliptical curve digital signature as input.

2. The method of claim 1, wherein pre-computing the incomplete elliptical curve digital signature further comprises:
   computing r=x mod n, where x is a first coordinate of a curve point, n an integer is an order of G, and G is an elliptic curve base point.

3. The method of claim 2, wherein the order of G means that n*G=0, wherein 0 is an identity element and * denotes elliptic curve point multiplication by a scalar.

4. The method of claim 1, wherein an inverse of a private key integer is pre-computed.

5. The method of claim 1, wherein a dummy message hash value of zero is used as the dummy message hash as an input to the security-hardened ECDSA computing engine for pre-computing the incomplete elliptical curve digital signature.

6. An Intelligent Transportation System using the method of claim 5 to generate the elliptical curve digital signature.

7. The system of claim 6, wherein an inverse of a private key integer is pre-computed each time a pseudo-identity related to the private key integer is changed.

8. The method of claim 1, wherein completing computation of the elliptical curve digital signature in the cryptographic coprocessor outside the security-hardened ECDSA computing engine uses blinding.

9. An Intelligent Transportation System using the method of claim 1 to generate the elliptical curve digital signature.

10. The Intelligent Transportation System of claim 9, wherein the elliptical curve digital signature is used to sign a safety message.

11. The method of claim 1, further comprising:
    computing a modular inverse to complete the computation of the elliptical curve digital signature.

12. The method of claim 11, further comprising:
    computing the modular inverse in the cryptographic coprocessor.

* * * * *